United States Patent [19]

Swedo et al.

[11] Patent Number: 4,792,404
[45] Date of Patent: Dec. 20, 1988

[54] DESALINATION OF SALINE WATER

[75] Inventors: Raymond J. Swedo, Mt. Prospect; Joseph J. Zupancic, Bensenville, both of Ill.

[73] Assignee: Allied-Signal Inc., Morristown, N.J.

[21] Appl. No.: 174,272

[22] Filed: Mar. 28, 1988

[51] Int. Cl.$^4$ .............................................. B01D 13/00
[52] U.S. Cl. ...................................... 210/654; 210/490
[58] Field of Search ........................ 427/244, 245, 246; 210/654, 490, 500.37

[56] References Cited

U.S. PATENT DOCUMENTS

| | | | |
|---|---|---|---|
| 3,260,691 | 7/1966 | Lavin et al. | 260/30.2 |
| 3,480,588 | 11/1969 | Lavin et al. | 260/47 |
| 3,567,632 | 3/1971 | Richter et al. | 210/23 |
| 3,600,350 | 8/1971 | Kwolek | 260/32.6 |
| 3,710,945 | 1/1973 | Dismore | 210/321 |
| 3,878,109 | 4/1975 | Ikeda et al. | 210/500 M |
| 3,904,519 | 9/1975 | McKinney, Jr. | 210/23 |
| 3,920,612 | 11/1975 | Stephens | 260/47 CP |
| 3,951,815 | 4/1976 | Wrasidlo | 210/500 M |
| 3,993,625 | 11/1976 | Kurihara et al. | 260/47 CP |
| 4,048,144 | 9/1977 | Stephens | 260/47 CP |
| 4,086,215 | 4/1978 | Kurihara et al. | 260/78 R |
| 4,277,344 | 7/1981 | Cadotte | 210/654 |
| 4,378,400 | 3/1983 | Makino et al. | 428/220 |
| 4,512,893 | 4/1985 | Makino et al. | 210/500.2 |
| 4,529,646 | 7/1985 | Sundet | 428/315.5 |
| 4,612,118 | 9/1986 | Kamiyama et al. | 210/490 |

*Primary Examiner*—Frank Spear
*Attorney, Agent, or Firm*—Thomas K. McBride; Raymond H. Nelson

[57] ABSTRACT

Saline water containing a chlorine-containing compound in the form of free chlorine, hypochlorite, etc. which has been added as a disinfectant or antibacterial compound is desalinated by passing the saline water through a semipermeable membrane which is resistant to the chlorine. The saline water is passed through this membrane at a temperature in the range of from ambient to about 50° C. and a pressure in the range of from about 1380 to about 6895 kPA (200–1000 psi). The chlorine-resistant semipermeable membrane comprises an interfacial polymerized condensation reaction product composited on a porous backing support material which has been prepared by contacting a porous support material such as polysulfone with a solution of a diaryl methylene monomer containing at least one amine radical on each aryl nucleus. The coated support material is then contacted with an organic solvent of an aromatic carboxylic acid chloride for a period of time sufficient to form an interfacial polymerized reaction product on the surface of the support material. Following this the composite is then cured at an elevated temperature to form the desired membrane.

22 Claims, No Drawings

DESALINATION OF SALINE WATER

BACKGROUND OF THE INVENTION

The separation of various components found in liquids or gases may be effected in a multitude of processes, the techniques for effecting the separation including ultrafiltration or reverse osomosis. A particular example of the latter type of separation involves a desalination process in which water, which is rendered potable or suitable for other purposes, is obtained from sea water, contaminated water, brackish water or brine. This process is of especial value in areas of the world where the water found in the area is brackish or is saline in nature. The desalination of this water is necessary in order to provide large amounts of potable or relatively nonsalty water for industrial, agricultural or home use. The desalination of the water is effected by forcing the water through a reverse osmosis membrane whereby the purified water is passed through the membrane and recovered, while the contaminants or salts do not pass through the membrane, thus, in effect, being rejected by the membrane and recovered as the retenate.

A reverse osmosis membrane, in order to be utilized for such a purpose, must possess certain characteristics applicable to the process. For example, the membrane must have a very high salt rejection coefficient. In addition, another important characteristic and a problem which must be addressed when utilizing the membrane, is the ability of the membrane to be resistant to chlorine attack. The resistance to chlorine is vital to the continued use of a membrane inasmuch as chlorine-containing compounds such as free chlorine, chloroamines, chlorine dioxide or hypochlorites, in many instances, are introduced to saline water such as sea water prior to subjecting the water to purification by means of a desalination process. These compounds are added to act as a disinfectant or as an antibacterial agent as well as to prevent the fouling of the membrane during the process due to the growth of microbiological organisms on the surface of the membrane.

Another important factor which is present in the use of a reverse osmosis membrane is that said membrane also possess a high flux characteristic, that is, the ability to pass a relatively large amount of water through the membrane at relatively low pressures. If a membrane possesses these desirable characteristics, it will be commercially feasible in its applicability to the desalination process.

Reverse osmosis membranes have been prepared and used from a wide variety of known polymeric materials. While many of these polymeric materials possess the ability of reducing the concentration of solute to where the salt rejection capability is in excess of 98%, some do not possess the necessary flux rate whereby the volume of water which is required to be produced by the membrane per unit of membrane surface is sufficient for the application of the technology.

As was hereinbefore set forth, many prior U.S. patents describe various membranes which are useful in desalination processes. For example, U.S. Pat. Nos. 3,567,632, 3,600,350, 3,710,945, 3,878,109, 3,904,519, 3,920,612, 3,951,815, 3,993,625, and 4,048,144 illustrate various semipermeable membranes prepared from polyamides. Likewise, U.S. Pat. Nos. 3,260,691, and 3,480,588 disclose coating compositions which are obtained from the condensation products of aromatic primary diamines and aromatic tricarboxylic compounds.

Inasmuch as the semipermeable membrane which is used for the desalination process should be relatively thin in nature in order to provide a desirable flux rate, it is necessary, in many instances, that the reverse osmosis membrane be composited or laminated on a porous backing support material. This porous support backing material should in itself possess certain characteristics which make it desirable for such a use. For example, the porous support material should possess pore sizes which are sufficiently large enough so that the water or permeate can pass through the support without affecting or lessening the flux rate of the entire composite. Conversely speaking, the pore size should not be large enough so that the thin composite semipermeable membrane will tend to fill up or enter into the pores, thus distorting the shape of the thin film membrane with the attendant possibility of rupturing the membrane, thus causing said membrane to lose its effectiveness in the reverse osmosis process.

In addition to the aforementioned U.S. patents, another U.S. Pat. No. 4,277,344, discloses an interfacial synthesized reverse osmosis membrane. This membrane is prepared from a cross-linked interfacially polymerized aromatic polyamide which has been prepared from an essentially monomeric polyacyl halide and an essentially monomeric arylene polyamine. The patent indicates that the monomeric arylene polyamine which is employed as one of the components in the interfacial polymerization reaction should be free of interfering substituents. The patent refers to these substituents as moieties which are capable of interfering with intermolecular amide-forming condensation reactions, and points out that such interference is generally steric, polar, and/or chemically reactive in nature. An example of steric interference or steric hindrance would be the location of a substituent other than hydrogen, even as small as a methyl group, on a ring position adjacent to an amine substituent on the arylene polyamine reactant. An example of polar/steric interference would be the presence of polar substituents, such as methoxy groups, on the arylene polyamine, particularly on a ring position adjacent to an amine substituent; while an example of chemical interference would be the location of an acyl-reactive substituent on the arylene polyamine or an amine-reactive substituent on the polyacyl halide. The patent further states that such chemical interfering substituents would lead to the formation of internal esters, internal amides, internal salts, or the like, or another possible consequence which would be attendant upon the performance of these moieties would be an unpredictable effect on cross-link densities. U.S. Pat. No. 4,086,215 teaches the use of asymetric free-standing polyamides which have been cross-linked with metal salts for use in permselective membrane applications. The preparation of these membranes involves three separate operations comprising: (1) the synthesis of linear soluble polyamides in solutions, (2) the preparation of asymmetric freestanding protomembranes from these polyamide solutions, and (3) the generation of active membranes by cross-linking the protomembranes with solutions of metal salts. The polyamides which are utilized in this patent consist of three components, namely, a diamine component bearing a pendant carboxylic acid or sulfonic acid group, a diamine component having a neutral aromatic or aliphatic nucleus, and a diacyl chloride or dianhydride component. The patentee states that the first component is essential to the performance of the membrane and it is this component which enables the protomembrane to be cross-linked with the metal salt and thus achieve the desired membrane performance. As will hereinafter be shown in greater detail the membrane of the present invention which is utilized to effect a desalination process and which is chlorine-resistant will comprise an ultra thin active layer consisting of only two components, namely, a diaryl methylene monomer containing at least 1 amine radical on each aryl nucleus, and an aromatic carboxylic acid chloride monomer. The amine monomers of the membrane of the present invention do not require the presence of a carboxylic acid or sulfonic acid pendant group in order to achieve the desired membrane performance, nor does the membrane system of the present invention require cross-linking with metal salts in order to achieve the desired performance.

In addition to these patents, U.S. Pat. Nos. 4,378,400 and 4,512,893 also describe the use of free-standing asymmetric polyimides for membrane application. The patents employ diaminodiphenyl methane in polyimide membranes for use in gas separations. However, these patents do not suggest the use of an aromatic tricarboxylic acid chloride reactant as one component of the desired membrane. Furthermore, polyimides and polyamides represent different chemical classes, each one having its own unique properties.

Another U.S. Pat. No. 4,529,646, discloses a process for preparing composite membranes. The process involves forming a porous polysulfone followed by quenching the polysulfone membrane in an aqueous solution of m-phenylenediamine, and thereafter reacting the m-phenylenediamine on the polysulfone membrane with either trimesoyl chloride or cyclohexane 1,3,5-tricarbonyl chloride in a water immiscible solution. This patent does not suggest or disclose the use of diaryl methylene monomer containing at least 1 amine radical on each aryl nucleus as one reactant in the formation of the desired membrane. Likewise, U.S. Pat. No. 4,612,118 discloses a semipermeable membrane comprising a composite of polyamine and triazine. The polyamine monomers which are utilized as one component of the membrane are not employed as a free amine. Rather, this amine is allowed to react with acryl triazines to form Michael-type adducts which are then utilized as the monomers in the membrane forming process. The resulting membranes are of the polyurea type, the urea group of which being generated by the reaction of the triazine Michael adducts with polyisocyanates, the latter being the other component of the membrane system. The polyurea type membranes which are formed by the process disclosed in this patent comprise a different chemical class having different physical and chemical properties than the polyamide membranes of the present invention.

We have now discovered that saline water may be desalinated by passage through a semipermeable membrane which possesses the desirable characteristics of high salt rejection, good flux, and high resistance to chlorine, said membrane being prepared in an interfacially polymerized reaction utilizing a diaryl methane monomer containing at least 1 amine radical on each aryl nucleus and aromatic carboxylic acid chloride as the reactive components.

SUMMARY OF THE INVENTION

This invention relates to a process for the desalination of saline water. More specifically the invention is concerned with a process for the desalination of saline water utilizing novel reverse osmosis semipermeable membranes which exhibit an extreme resistance to chlorine degradation.

As was previously discussed, the use of reverse osmosis membranes for the separation of liquids from liquids or solids from liquids are important articles of commerce. This is especially true in the area of desalination whereby water which is brackish or saline in nature may be rendered potable or suitable for use in other industrial or agricultural regions by passing the water through reverse osmosis membranes. The particular membranes which constitute the inventive feature of the present application will comprise the reaction product resulting from the reaction of a diaryl methylene monomer containing at least one amine radical on each aryl nucleus and an aromatic carboxylic acid chloride, said membrane being composited or coated on a porous support backing material. By utilizing these membranes in a desalination process, it is possible to treat a saline or brackish water source over a relatively long period of time without replacement of the membrane, the long life of the membrane being, in part, due to the resistance to degradation resulting from exposure to chlorine in the water source.

It is therefore an object of this invention to provide a process for the desalination of saline water utilizing a reverse osmosis membrane, suitable for use in separation processes, which possesses desirable physical and chemical characteristics.

A further object of this invention is to provide a process for preparing a semipermeable membrane which is resistant to chlorine, thus rendering the membrane suitable for use in separation processes such as desalination of water where chlorine is present in an amount sufficient to degrade other types of membranes.

In one aspect, an embodiment of this invention resides in a process for the desalination of a saline water feedstream in the presence of an added chlorine-containing compound which comprises contacting said feedstream with the upstream face of a chlorine-resistant semipermeable membrane comprising a porous support backing material having composited thereon an interfacial polymerized condensation product resulting from the condensation reaction of a diaryl methylene monomer containing at least one amine radical on each aryl nucleus and an aromatic carboxylic acid chloride at separation conditions and recovering the resultant desalinated water downstream subsequent to passage through said membrane.

Another embodiment of this invention is found in a chlorine-resistant semipermeable membrane which comprises a porous support backing material having composited thereon an interfacial polymerized condensation product resulting from the reaction of a diaryl methylene monomer containing at least one amine radical on each aryl nucleus and an aromatic carboxylic acid chloride.

Yet another embodiment of this invention resides in a process for the preparation of a chlorine-resistant semipermeable membrane which comprises casting a solution of a diaryl methylene monomer containing at least one amine radical on each aryl nucleus on a porous support backing material, removing excess solution, contacting the coated support with an organic solvent solution of an aromatic carboxylic acid chloride to form an interfacial polymerized condensation reaction product on the surface of said porous support backing material, removing excess solution, curing the resultant composite at curing conditions, and recovering the resultant chlorine-resistant semipermeable membrane.

A specific embodiment of this invention is found in a chlorine-resistant semipermeable membrane comprising polysulfone having supported thereon the interfacial polymerized condensation reaction product resulting from the reaction of 4,4'-diaminodiphenylmethane with trimesoyl chloride.

Another specific embodiment of this invention resides in a process for the preparation of a chlorine-resistant semipermeable membrane which comprises casting a solution of 4,4'-diaminodiphenylmethane in 100% acetonitrile, a 50/50 water-acetonitrile mixture, or mixtures of intermediate composition on a porous backing support material comprising polysulfone, removing excess solution, contacting said coated polysulfone with a hexane solution of trimesoyl chloride to form an interfacial polymerized condensation reaction product membrane on the surface of said polysulfone, removing excess solution, curing the resultant composite at a temperature in the range of from about 25° to about 150° C. for a period of time in the range of from about 1 minute to about 2 hours, and recovering the resultant chlorine-resistant semipermeable membrane.

Other objects and embodiments will be found in the following detailed description of the invention.

DETAILED DESCRIPTION OF THE INVENTION

As hereinbefore set forth the present invention is concerned with a separation process involving the desalination of saline water. The process utilizes as the separation means a semipermeable membrane which is resistant to chlorine. As was previously discussed the membranes which are utilized to effect the desired separation and provide water which is suitable for a wide variety of uses including being potable comprise as a thin film composite the intefacial polymerized reaction product resulting from the reaction between a diaryl methylene monomer containing at least one amine radical on each aryl nucleus and an aromatic polycarboxylic acid chloride, said membrane being composited on a porous backing support material. This interfacial polymerized condensation reaction product differs from previous membranes which comprise free-standing asymmetric membranes of a polyimide type or polyamides comprising three components rather than the two component membrane which is utilized in the present invention.

The separation process involving the desalination of sea water or brackish water as well as other treatments of water such as softening of hard water whereby salts are removed, concentration of whey, etc. is effected in a reverse osmosis type separation. The reverse osmosis system or apparatus which is employed to effect the separation may comprise any of the various types of reverse osmosis apparatus which are known in the art. The membranes which are employed in this system are in the form of flat sheets which are particularly applicable for use in reverse osmosis modules either in a single sheet or in multiple sheet units whereby the sheet or sheets are wound in a spiral type configuration. In the preferred embodiment of the invention, the separation process is employed in a continuous type of operation in which the water is charged from a reservoir containing the same in a feedstream which contacts the upstream face of the chlorine-resistant semipermeable membrane of the present invention. Passage through this membrane results in producing a permeate and a retentate, the permeate comprising the desalinated water while the retentate comprises the unwanted salts or other contaminants present in the saline water feedstream. As was previously discussed, the saline water feedstream also contains a chlorine containing compound of the type previously set forth in greater detail which has been added as a disinfectant or as an antibacterial agent. The separation process is usually effected at separation conditions which may include a temperature in the range of from about ambient to about 50° C. and an applied pressure in the range of from about 1380 kPa (200 psi) to about 6895 kPa (1000 psi). The chlorine-resistant semipermeable membrane which is utilized in the process of the present invention will comprise an interfacial polymerized condensation reaction produce resulting from the reaction between a diaryl methylene monomer containing at least one amine radical on each aryl nucleus and an aromatic carboxylic acid chloride, said reaction product being composited on a porous support backing material. These membranes are prepared by casting a solution of the methylene monomer in 100% acetonitrile, a 50/50 mixture of acetonitrile-water, or mixtures of intermediate composition on a porous support backing material, removing excess solution, and thereafter contacting the coated support material with an organic solvent solution of an aromatic carboxylic acid chloride, said organic solvent being immiscible with the acetonitrile solution whereby the interfacial polymerized condensation reaction product is found on the surface of the support material. The resulting composite is then cured to provide a semipermeable membrane which exhibits favorable characteristics with respect to salt rejection and flux as well as a resistance to chlorine which is present due to the added chlorine-containing compound in the feedstream.

As was hereinbefore set forth, one component of the interfacial polymerized condensation product will comprise aromatic di- or tricarboxylic acid chlorides such as isophthaloyl chloride, terephthaloyl chloride, trimesoyl chloride (1,3,5-benzenetricarboxylic acid chloride) as well as mixtures of trimesoyl chloride with the isomeric phthaloyl chlorides, mixtures of the isomeric phthaloyl chlorides, or mixtures of the aromatic di- or tricarboxylic acid chlorides with benzoyl chloride.

The other component of the reaction will comprise a diaryl methylene monomer containing at least one amine radical on each aryl or heterocyclic nucleus. Some specific examples of these compounds will include:
2,2'-diaminodiphenylmethane;
3,3'-diaminodiphenylmethane;
4,4'-diaminodiphenylmethane;
2,4'-diaminodiphenylmethane;
2,3'-diaminodiphenylmethane;
2,3,4'-triaminodiphenylmethane;
2,4,4'-triaminodiphenylmethane;
2,2',4,4'-tetraaminodiphenylmethane;
3,3',4,4'-tetraaminodiphenylmethane;
2,2'-diaminodinaphthylmethane;
3,3'-diaminodinaphthylmethane;
4,4'-diaminodinaphthylmethane;
2,2',3,3'-tetraaminodinaphthylmethane;

2,2',4,4'-tetraaminodinaphthylmethane.

It is to be understood that the aforementioned aromatic carboxylic acid chlorides and diaryl methylene monomer containing at least one amine radical on each aryl nucleus compounds are only representative of the types of components which may be used to form the interfacial polymerized reaction products, and that the present invention is not necessarily limited thereto.

In one embodiment, the chlorine-resistant semipermeable membranes which are used to effect the separation process of the present invention may be prepared by coating the porous support backing material with a solution of the diaryl methylene monomer containing at least one amine radical on each aryl nucleus. The medium which is employed for the aforesaid monomer will be selected from the group consisting of 100% acetonitrile, a 50/50 mixture of water/acetonitrile and mixtures of water and acetonitrile of intermediate composition. As was previously set forth, the porous support backing material comprises a polymeric material containing pore sizes which are sufficient to permit the passage of permeate therethrough but are not large enough so as to intefere with the bridging over of the resulting ultrathin reverse osmosis membrane. In the preferred embodiment of the invention, the pore sizes of the porous support backing material will range from about 1 to about 1000 millimicrons inasmuch as pores which are larger than 1000 millimicrons will permit the ultra-thin reverse osmosis membrane to sag into the pore, thus disrupting the flat sheet configuration which is a desirable characteristic of the membrane. Examples of porous support backing material which may be used to prepare the desired membrane composite will include such polymers as polysulfone, polycarbonate, microporous polypropylene, the various polyamides, polyphenylene oxide, polyphenylene ether sulfone, etc.

The porous support backing material is coated with a solution of the diaryl methylene monomer in 100% acetonitrile, a 50/50 mixture of wateracetonitrile, or mixtures of intermediate composition, containing at least one amine radical on each aryl nucleus, utilizing either a hand casting or continuous operation. In the preferred embodiment of the invention, the diaryl methylene monomer containing at least one amine radical on each aryl nucleus will be present in the solution in an amount in the range of from about 0.1 to about 5% by weight of the solution. In addition, it is also contemplated within the scope of this invention that the solution may also contain additional components which, while not entering into the reaction, provide additional assistance in formulating the desired interfacial polymerization reaction product. Examples of these additives which may be present will include surfactants including ionic surfactants such as sodium lauryl sulfate, lower molecular weight alcohols such as methanol, ethanol, the isomeric propanols, butanols, or nonionic surfactants such as polyethylene glycol, polypropylene glycol, copolymers of ethylene glycol and propylene glycol, etc. In addition, the aqueous solution may also contain basic acid scavengers such as sodium hydroxide, potassium hydroxide, sodium carbonate, potassium carbonate, etc.

After coating the porous support backing material with the solution of the diaryl methylene monomer containing at least one amine radical on each aryl nucleus, the excess solution is drained and the coated support material is then contacted with an organic solvent solution of the aromatic carboxylic acid chlorides. Again, in the preferred embodiment of the invention, the aromatic carboxylic acid chlorides are present in the organic solvent solution in a range of from about 0.1 to about 5% by weight of the solution. The organic solvents which are employed in the process of this invention will comprise paraffins such as n-pentane, n-hexane, n-heptane, etc., the isomeric pentanes, hexanes, heptanes, etc., cyclopentane, cyclohexane, methylcyclopentane, etc., petroleum etheres, naphthas, or a halogenated solvent such as trichlorotrifluoroethane.

Inasmuch as the organic solvent and the solvent for the diaryl methylene monomer containing at least one amine radical on each aryl nucleus are substantially immiscible or incompatible, the polymerization of the two components of the membrane will occur substantially only at the interface between the solvent phases and thus an interfacially polymerized reaction product comprising a thin film membrane will be formed thereat. The contact time required for the formation of the thin film membrane will fluctuate over a relatively wide range of from about 1 second to about 60 seconds. Following the formation of the interfacially polymerized reaction product on the surface of the porous support backing material, the resultant composite may be cured to remove any remaining solvent and firmly affix the thin film membrane on the surface of the support. The curing of the composite membrane may be effected over a wide temperature range, said temperature being from ambient (20°–25° C.) up to about 150° C. for a period of time ranging from about 1 minute to about 2 hours or more in duration. The operating parameters of time and temperature will be interdependent, the primary criteria for the curing of the membrane being that said curing time is sufficient to provide the desired membrane but being insufficient to affect the desired characteristics of the thin film membrane and the porous backing support material. For example, excessive heat or curing time may affect the pore size of the backing material, thus resulting in a decrease of the desired flux rate of the membrane.

It is also comtemplated within the scope of this invention that the chlorine-resistant semipermeable membrane may be prepared in a continuous manner of operation. When this type of operation is employed, a porous support backing material of the type hereinbefore set forth in greater detail is continuously passed through a bath of a solution of the diaryl methylene monomer containing at least one amine radical on each aryl nucleus, said solution also containing, if so desired, a surfactant and an acid scavenger. After passage through the bath, the backing material is continuously withdrawn and, if so desired, passed between rollers in order to remove any excess solution which may be present. The coated support material is then also continuously passed through the solution of the aromatic carboxylic acid chloride in an organic solvent. The interfacial polymerization reaction will occur during the contact time between the solutions following which the composite comprising the interfacial polymerized reaction product in the form a thin film semipermeable membrane on the porous support backing material will then be cured as, for example, by passage through an oven which is maintained at a desired curing temperature, the passage through said oven being at a predetermined rate so as to avoid any possible damage to the composite membrane.

The resultant chlorine-resistant semipermeable membrane may then be employed for the separation process desired such as the desalination of sea water or brackish water, other treatments of water such as softening of hard water whereby salts are removed, boiling said water treatment, concentration of whey, etc. The membranes which are in the form of flat sheets are particularly applicable for use in modules either in single sheet or multiple sheet units whereby the sheet or sheets are wound in a spiral type configuration.

The following exampls are given for purposes of illustrating the separation process of the present invention and the chlorine-resistant semipermeable membranes which are utilized to effect the separation as well as a process for preparing the membranes. However, it is to be understood that these examples are provided merely for purposes of illustration and that the present invention is not necessarily limited thereto.

EXAMPLE I

A chlorine-resistant semipermeable membrane was prepared by hand-casting a solution comprising 1.0% by weight of 4,4'-diaminodiphenylmethane in a solvent comprising a 50/50 mixture of acetonitrile and water on a 20.3 cm×25.4 cm (8"×10") sheet of polysulfone at ambient temperature and pressure. The excess solution was drained after a period of 30 seconds and the coated polysulfone was contacted with a solution comprising 0.85% by weight of trimesoyl chloride and 0.15% by weight of isophthaloyl chloride in a hexane solvent. After a period of 30 seconds, the excess organic solvent was drained and the resulting solution was cured at a temperature of 70° C. for a period of 30 minutes.

A sample of this membrane in a size of 2.5 cm×7.6 cm (1"×3") was placed in a cell and a synthetic sea-water feed containing 5,000 ppm of sodium chloride was passed across the surface of the membrane at a feed flow rate of 0.295 m$^3$/hour (1.3 gallons/minute). The test conditions which were employed during the experiment includes a pressure of 5516 kPa (800 psi) on one side of the membrane while the other side of the membrane was maintained at atmospheric pressure. A temperature of 25° C. was maintained throughout the experiment while keeping the pH of the feed at 5.5. The permeate which was collected from the flowthrough was measured and it was found that there had been a 93.5% rejection of sodium chloride at a flux rate of 0.32 cubic meters per square meters per day (mmd) [7.8 gallons per square foot of membrane per day (gfd)].

EXAMPLE II

In a manner similar to that set forth in the above example, another membrane was prepared by contacting a 20.3 cm×25.4 cm (8"×10") sheet of polysylfone with a solution comprising 1.0% by weight of 4,4'-diaminodiphenylmethane in a solvent comprising 97% of a 50/50 mixture of acetonitrile and water and 3.0% by weight of isopropyl alcohol. The contact of the polysulfone was effected at ambient temperature and pressure for a period of 30 seconds. The excess solution was drained and the coated polysulfone support was contacted with an organic solution comprising 0.1% by weight of trimesoyl chloride in hexane. After allowing the contact time of 30 seconds to elapse, the excess solution was drained and the membrane composite was dried at a temperature of 70° C. for a period of 30 minutes.

As in the previous example, a 2.5 cm×7.6 cm (1"×3") sample of the membrane was placed in a cell and subjected to a feed similar in nature to the set forth in Example I under similar reaction conditions. Analysis of the permeate recovered from this experiment disclosed a 96.4% rejection of sodium chloride at a flux of 0.24 mmd (5.8 gfd).

Similar membranes prepared by varying the weight of trimesoyl chloride from 0.25 to 0.5% by weight in a hexane solvent showed sodium chloride rejections ranging from 70% to about 90% at flux rates ranging from 0.32 to 0.53 mmd (7.8 to 12.9 gfd).

EXAMPLE III

In this example, a membrane was prepared using a continuous casting technique. The process was effected by continuously passing a sheet of polysulfone through a bath of 1.0% by weight of 4,4'-diaminodiphenylmethane in a solvent comprising 97% of a 50/50% mixture of acetonitrile and water and 3% by weight of isopropyl alcohol. The rate of passage of the polysulfone sheet through the bath was effected at a rate of 0.0017 meters/second (0.33 feet/minute) at atmospheric pressure and ambiend temperature. The contact of the polysulfone sheet with the solution lasted for a period of 20 seconds. The sheet of coated polysulfone was continuously withdrawn and the excess aqueous solution was drained therefrom. Following this, the sheet was continuously passed through a bath of hexane which contained 1.0% by weight of trimesoyl chloride, the contact of the coated polysulfone sheet with the organic solution lasting for a period of 20 seconds. Thereafter, the composite was recovered and subjected to a curing step in an oven at a temperature of 70° C. for a period of 30 minutes.

A 2.5 cm×7.6 cm (1"×3") sample of the thus prepared membrane was placed in a cell and a feedstock comprising a synthetic sea-water feed which contained 5,000 ppm of sodium chloride was passed over the surface of the membrane at a temperature of 25° C., a pH of 5.5 and a pressure of 5516 kPa (800 psi) on one side of the membrane, the other side of the membrane being maintained at atmospheric pressure. The permeate was analyzed and it was found that there had been a 92% rejection of the sodium chloride at a flux rate of 0.32 mmd (7.8 gfd).

Similar membranes prepared using varying amounts of 4,4'-diaminodiphenylmethane also resulted in sodium chloride rejection rates ranging from about 63% to about 91% at flux rates which varied from 0.04 mmd to about 0.6 mmd (1 to 15 gfd).

EXAMPLE IV

In this example, a chlorine-resistant semipermeable membrane was prepared by a continuous casting technique. A 0.50 wt. % solution of 2,2',4,4'-tetraaminodiphenylmethane was prepared by suspending the hydrochloride salt of the amine in a solvent comprising a 50/50 mixture of acetonitrile and water, the liberating the free amine by neutralizing the suspension to pH 7 with an aqueous solution of sodium hydroxide, whereupon a homogeneous solution was attained. A sheet of polysulfone was passed in a continuous manner through a bath containing the above-prepared amine solution. The rate of passage of the polysulfone through the bath was effected at a rate of 0.0017 meters/second (0.33 feet/minute) at atmospheric pressure and ambient temperature. The contact of the polysulfone sheet with the amine solution laster for a period of 20 seconds. The sheet of coated polysulfone was continuously withdrawn from the amine solution bath and the excess solution was drained therefrom. Following this, the sheet was continuously passed through a bath of hexane which contained 0.50% by weight of trimesoyl chloride, the contact of the coated polysulfone sheet with the organic solution lasting for a period of 20 seconds. Thereafter, the composite was recovered and subjected to a curing step in an oven at a temperature of 70° C. for a period of 30 minutes.

A 2.5 cm×7.6 cm (1"×3") sample of the thus prepared membrane was placed in a cell and a feedstock comprising a synthetic sea-water feed which contained 5,000 ppm of sodium chloride was passed over the surface of the membrane at a temperature of 25° C., a pH of 5.5 and a pressure of 5516 kPa (800 psi) on one side of the membrane, the other side of the membrane being maintained at atmospheric pressure. The permeate was analyzed and it was found that there had been an 81.7% rejection of sodium chloride at a permeate flux rate of 0.63 mmd (15.2 gfd).

A similar membrane was prepared from an amine solution neutralized to a pH of 8, and resulted in a sodium chloride rejection of 75.8% with a flux rate of 7.0 mmd (17.1 gfd).

Another membrane prepared from an amine solution neutralized to a pH of 9 gave a sodium chloride rejection of 78% with a permeate flux rate of 0.92 mmd (22.5 gfd).

EXAMPLE V

Membrane samples prepared according to the methods described in Examples I to IV were selected to illustrate the chlorine-resistant properties of these membranes. Samples exhibiting only moderate sodium chloride rejection values and high flux rates were chosen so that the effects of exposure of chlorine-containing compounds would be more pronounced.

Thus, 2.5 cm×7.6 cm (1"×3") samples of membranes were placed in cells and subjected to a synthetic sea-water feed containing 5,000 ppm of sodium chloride at a feed flow rate of 0.295 m$^3$/hour (1.3 gallons/minute). The charge to the surface of the membranes was effected at a pressure of 5516 kPa (800 psi) while maintaining the temperature at 25° C. and the pH of the feed at 5.5. After 1 hour at these test conditions, the permeates from the cells were analyzed. These results provided the baseline performance for these membranes.

Without removing the samples from the cells, sodium hypochlorite was added to the sea-water feed to give an effective chlorine concentration of 4 ppm. The membranes were then subjected to this hypochlorite-containing feed under the same operating conditions hereinbefore described. After 2 hours under these conditions, the permeates from the cells were analyzed. The results of these analyses are set forth in Table 1.

TABLE 1

| Membrane Sample | Without Hypochlorite | | | With Hypochlorite | | |
|---|---|---|---|---|---|---|
| | Rejection (%) | Flux (MMD) | (GFD) | Rejection (%) | Flux (MMD) | (GFD) |
| A | 70 | 0.97 | 23.7 | 77 | 0.67 | 16.4 |
| B | 76 | 0.87 | 21.3 | 80 | 0.69 | 16.8 |
| C | 16 | 1.7 | 42.0 | 72 | 1.1 | 26.0 |
| D | 77 | 0.11 | 2.6 | 79 | 0.09 | 2.2 |

A & B 0.5% 2,2',4,4'-tetraaminodiphenylmethane/0.5% trimesoyl chloride
C & D 2.0% 4,4'-diaminodiphenylmethane/0.95% trimesoyl chloride + 0.05% benzoyl chloride It is to be noted from the above performance of the membranes that after hypochlorite addition to the sea-water feed, there was a modest decrease in the flux rates and at the same time, an increase in the percent rejection of sodium chloride. These results are the direct opposite of what would be exhibited had membrane degradation occurred. Thus, the results demonstrate the chlorine resistance of the membranes of the present invention.

EXAMPLE VI

To illustrate chlorine resistance under harsher conditions than those employed in Example V, samples of membranes prepared according to Examples I to IV were again selected on the basis of low sodium chloride rejection values and high flux rates. The membranes were soaked in an aqueous solution of sodium hypochlorite, containing an effective chlorine concentration of 8 ppm, at ambient pressure and temperature, for a period of 11 days. Membrane samples 2.5 cm×7.6 cm (1"×3") in size were placed in cells and subjected to a synthetic sea-water feed containing 5,000 ppm of sodium chloride at a feed flow rate of 0.295 m$^3$/hour (1.3 gallons/minute). The charge to the surface of the membranes was effected at a pressure of 5516 kPa (800 psi) while maintaining the temperature at 25° C. and the pH of the feed at 5.5. After 1 hour at these test conditions, the permeates from the cells were analyzed. These analyzes provided baseline performance for these membranes.

Without removing the membranes from the cells, sodium hypochlorite was added to the sea-water feed to give an effective chlorine concentration of 5 ppm. The membranes were then subjected to this hypochlorite-containing feed under the same operating conditions hereinbefore described. After 1.5 hours under these test conditions, the permeates from the cells were analyzed. The results of these analyses are set forth in Table 2.

TABLE 2

| Membrane Sample | After Soaking | | | With Hypochlorite in Feed | | |
|---|---|---|---|---|---|---|
| | Rejection (%) | Flux (MMD) | (GFD) | Rejection (%) | Flux (MMD) | (GFD) |
| A | 22 | 4.0 | 97.0 | 26 | 3.0 | 73.4 |
| B | 31 | 3.8 | 92.0 | 36 | 2.9 | 70.9 |
| C | 18 | 1.6 | 38.9 | 22 | 1.2 | 30.0 |
| D | 51 | 0.37 | 9.0 | 53 | 0.29 | 7.1 |

A & B 0.5% 2,2',4,4'-tetraaminodiphenylmethane/0.5% trimesoyl chloride
C & D 2.0% 4,4'-diaminodiphenylmethane/0.95% trimesoyl chloride + 0.05% benzoyl chloride Once again, it is to be noted that even after prolonged hypochlorite soaking followed by hypochlorite addition to the sea-water feed, the above membranes exhibited a modest decrease in the flux rates and at the same time, an increase in the percent rejection of sodium chloride. These results again indicate that the membranes are still intact, and their performance is directly opposite what one would observe if membrane degradation had occurred. Thus, the results demonstrate the chlorine resistance of the membranes of the present invention.

We claim as our invention:

1. A process for the desalination of a saline water feedstream in the presence of an added chlorine-containing compound which comprises contacting said feedstream with the upstream face of a chlorine-resistant semipermeable membrane comprising a porous support backing material having composited thereon an interfacial polymerized condensation product resulting from the condensation reaction of a diaryl methylene monomer containing at least one amine radical on each aryl nucleus and an aromatic carboxylic acid chloride at separation conditions and recovering the resultant desalinated water downstream subsequent to passage through said membrane.

2. The process of claim 1 in which said separation conditions include a temperature in the range of from about ambient to about 50° C. and a pressure in the range of from about 1380 kPa (200 psi) to about 6895 kPa (1000 psi).

3. The process of claim 1 in which said chlorine-containing compound comprises free chlorine.

4. The process of claim 1 in which said chlorine-containing compound comprises chloroamines.

5. The process of claim 1 in which said chlorine-containing compound comprises chlorine dioxide.

6. The process of claim 1 in which said chlorine-containing compound comprises hypochlorite.

7. A chlorine-resistant semipermeable membrane which comprises a porous support backing material having composited thereon an interfacial polymerized condensation product resulting from the reaction of a diaryl methylene monomer containing at least one amine radical on each aryl nucleus and an aromatic carboxylic acid chloride.

8. The chlorine-resistant semipermeable membrane of claim 7 in which said diaryl methylene monomer and said aromatic carboxylic acid chloride are present in said interfacial polymerized condensation product in a weight ratio in the range of from about 0.1:1 to about 40:1 weight percent of diaryl methylene monomer per weight percent of aromatic carboxlic acid chloride.

9. The chlorine-resistant semipermeable membrane of claim 7 in which said diaryl methylene monomer is selected from the group consisting of 4,4'-diaminodiphenyl methane, 3,3'-diaminodiphenyl methane, 2,2'-diaminodiphenyl methane, 2,4'-diaminodiphenyl methane, and 2,2',4,4'-tetraaminodiphenyl methane.

10. The chlorine-resistant semipermeable membrane of claim 7 in which said aromatic carboxylic acid chloride is selected from the group consisting of benzoyl chloride, isophthaloyl chloride, terephthaloyl chloride, trimesoyl chloride, and mixtures thereof.

11. The chlorine-resistant semipermeable membrane of claim 7 in which said porous support backing material is selected from the group consisting of polysulfone, polycarbonate and polyphenylene oxide.

12. The chlorine-resistant semipermeable membrane of claim 7 in which said diarylmethylene monomer is 4,4'-diaminodiphenyl methane, said aromatic carboxylic acid chloride is trimesoyl chloride and said porous support backing material polysulfone.

13. The chlorine-resistant semipermeable membrane of claim 7 in which said diarylmethylene monomer is 2,4'-diaminodiphenyl methane, said aromatic carboxylic acid chloride is trimesoyl chloride and said porous support backing material is polysulfone.

14. The chlorine-resistant semipermeable membrane of claim 7 in which said diarylmethylene monomer is 2,2',4,4'-tetraaminodiphenyl methane, said aromatic carboxylic acid chloride is trimesoyl chloride and said porous support backing material is polysulfone.

15. A process for the preparation of a chlorine-resistant semipermeable membrane which comprises casting a solution of diaryl methylene monomer containing at least one amine radical on each aryl nucleus on a porous support backing material, removing excess solution, contacting the coated support with an organic solvent solution of an aromatic carboxylic acid chloride to form an interfacial polymerized condensation reaction product on the surface of said porous support backing material, removing excess solution, curing the resultant composite at curing conditions, and recovering the resultant chlorine-resistant semipermeable membrane.

16. The process of claim 15 in which said solution of said diaryl methylene monomer containing at least one amine radical on each aryl nucleus is selected from the group consisting of 100% acetonitrile, a 50/50 mixture of acetontrile-water, and mixtures of acetonitrile and water of intermediate composition.

17. The process of claim 15 in which said solution of said diaryl methylene monomer containing at least one amine radical on each aryl nucleus contains a basic acid scavenger.

18. The process of claim 15 in which said aqueous solution of said diaryl methylene monomer containing at least one amine radical on each aryl nucleus contains an ionic or nonionic surfactant.

19. The process of claim 15 in which said curing conditions include a temperature in the range of from about 25° C. to about 150° C. for a period of time in the range of from about 1 minute to about 2 hours.

20. The process of claim 15 in which said diarylmethylene monomer is 4,4'-diaminodiphenylmethane, said aromatic carboxylic acid chloride is trimesoyl chloride and said porous support backing material is polysulfone.

21. The process of claim 15 in which said diarylmethylene monomer is 2,4'-diaminophenyl methane, said aromatic carboxylic acid chloride is trimesoyl chloride and said porous support backing material is polysulfone.

22. The process of claim 15 in which said diarylmethylene monomer is 2,2',4,4'-tetraaminodiphenyl methane, said aromatic carboxylic acid chloride is trimesoyl chloride and said porous support backing material is polysulfone.

* * * * *